(12) United States Patent
Yu et al.

(10) Patent No.: US 7,178,736 B2
(45) Date of Patent: Feb. 20, 2007

(54) SOCKET OF CARD READER (I) FOR MEMORY CARD WITH CONNECTING TERMINALS FOLLOWING SPECIFICATION OF USB

(75) Inventors: An-Yu Yu, Taipei (TW); Tseng Shyang Lin, Taipei (TW); Ching Yi Yeh, Taipei (TW); Chi Sen Chang, Taipei (TW); Ping Yang Chuang, Taipei (TW)

(73) Assignee: Northstar Systems Corp., Taipei (TW)

( * ) Notice: Subject to any disclaimer, the term of this patent is extended or adjusted under 35 U.S.C. 154(b) by 163 days.

(21) Appl. No.: 11/099,441

(22) Filed: Apr. 6, 2005

(65) Prior Publication Data

US 2006/0226222 A1 Oct. 12, 2006

(51) Int. Cl.
G06K 7/00 (2006.01)

(52) U.S. Cl. ...................... 235/486; 235/441

(58) Field of Classification Search ............... 235/486, 235/492, 441, 487, 475, 479; 439/159; 710/302
See application file for complete search history.

(56) References Cited

U.S. PATENT DOCUMENTS

| | | | |
|---|---|---|---|
| 6,783,078 B1* | 8/2004 | Leaming | 235/492 |
| 6,840,454 B1* | 1/2005 | Rhelimi | 235/492 |
| 7,114,659 B2* | 10/2006 | Harari et al. | 235/492 |
| 2002/0185533 A1* | 12/2002 | Shieh et al. | 235/441 |
| 2004/0235325 A1* | 11/2004 | Iijima | 439/159 |
| 2005/0029360 A1* | 2/2005 | Rhelimi | 235/492 |
| 2005/0236491 A1* | 10/2005 | Leaming | 235/492 |

* cited by examiner

Primary Examiner—Thien M. Le
(74) Attorney, Agent, or Firm—Bacon & Thomas, PLLC

(57) ABSTRACT

The present invention is a socket of card reader (I) for memory card with connecting terminals following specification of USB, which is a socket of card reader utilizing 4 pin USB (Universal Serial Bus) architecture for reading flash memory card with USB-compatible specification. The said socket of card reader is composed of a housing, a base, and 4 connecting terminals. Therefore, in comparison to the existing card reader that contains numerous connecting terminals, the present invention is apt to be implanted into related informational products. Besides, as the circuit architecture of USB connecting port is directly applied, the cost of developing new connecting architecture is thus saved.

3 Claims, 3 Drawing Sheets

SOCKET OF CARD READER (I) FOR MEMORY CARD WITH CONNECTING TERMINALS FOLLOWING SPECIFICATION OF USB

BACKGROUND OF THE INVENTION

1) Field of the Invention

The present invention is a socket of card reader (I) for memory card with connecting terminals following specification of USB, which is a socket of card reader for accepting memory card with USB 4 pin specification through USB circuit architecture. This invention is a socket of card reader that applies the existing circuit specification to connect to a memory card.

2) Description of the Prior Art

To differentiate from memory card with distinct specification, a memory card is typically distinguished through its shape, thickness, depth (length), or connecting pins. However, the number of connecting terminals (PIN) of existing memory cards are complicate. For example, CF card has 50 PIN, SD card has 9 PIN, MS card has 10 PIN, MMC card has 7 PIN, and SM card has 22 PIN. The architectures constructed by the existing card-reading modules have occupied a considerable space, and the position for connecting a memory card with distinct specification should be carefully calculated in order to differentiate memory cards with distinct specifications. Therefore, when the number of connecting terminals gets larger, cost of manufacturing is accordingly raised and the possibility for advance development or improvement is thus limited.

On the other hand, connecting and reading a memory card through USB is not a new technology, as disclosed in the U.S. Pat. No. 6,148,354, "Architecture for a universal serial bus-based PC flash disk". Thus, the inventor of this invention focuses on the memory card with connector of USB 4 pins specification and develops a socket of card reader that serves as a socket of card reader for accepting memory card through the existing USB circuit architecture.

SUMMARY OF THE INVENTION

The primary purpose of the socket of card reader (I) for memory card with connecting terminals following specification of USB is not only simplifying the complicate circuit layout in the existing socket of card reader for memory card but also reducing the size of socket of card reader and thus facilitates its implanting into the products of electrical appliance.

A further purpose of the socket of card reader (I) for memory card with connecting terminals following specification of USB is to present a socket of card reader that follows the existing architecture of USB connecting port and saves the cost of developing a new connecting circuit architecture.

As USB has the following features:
1. It is excellent in expansion that allows serializing tens of peripherals.
2. All serialized USB devices occupy only one set of system resource (IRQ, DMA, and I/O address).
3. USB 2.0 supports a 480 Mb/s high data transfer rate.
4. The host can deliver power through USB interface to the peripherals.
5. It supports Hot Swapping as well as PnP.

Therefore, many manufacturers of memory card took this architecture as their connecting interface. The present invention not only applies and improves the existing technical resources, but significantly reduce the size of the whole socket of card reader as well. The key points described above have completely corresponded to the necessary conditions of patent pending. The detailed descriptions as well as the technical contents of the invention shall be given with the accompanying drawings hereunder.

DETAILED DESCRIPTION OF THE PREFERRED EMBODIMENTS

Figure 1:
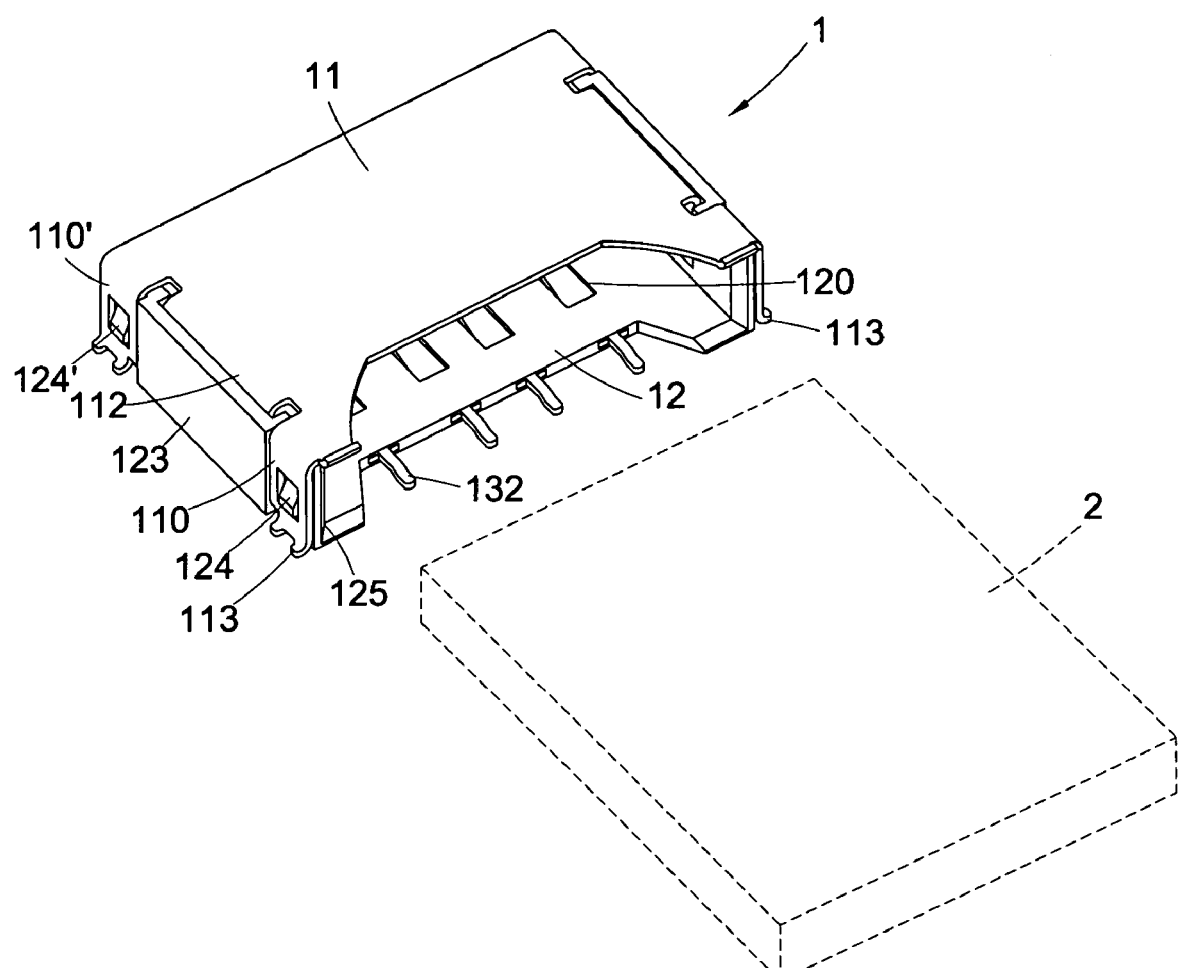
FIG. 1 shows an elevational view according to the present invention.
Figure 2:
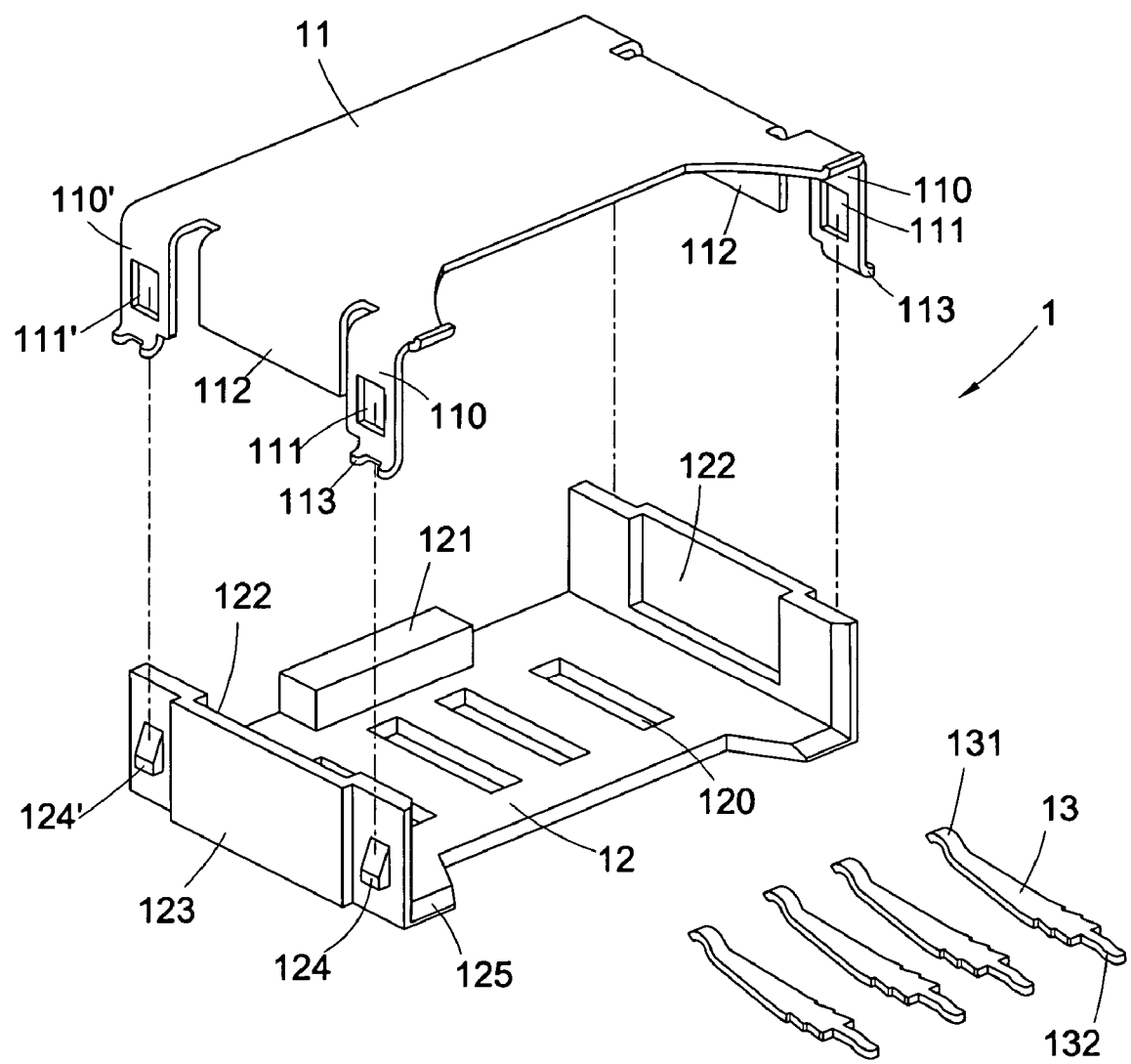
FIG. 2 shows an exploded elevational view according to the present invention.

Referring to FIGS. 1 and 2, in which the socket of card reader 1 according to the present invention at least includes a housing 11, a base 12, and four connecting terminals 13; the said housing 11 is made from metal material, and is integrally pressed into a form of hollow cube with bottom opened. On the symmetrical bend parts 110, 110' of housing 11, two locking holes are separately formed to correspond to the locking part 124, 124' of base 12 and serve as locking components for combining base 12 and housing 11. A weld part 113 is formed at the lower side of bend parts 110, 110' to serve as a connecting part of circuit, and an embedding plate 112 is formed between two bend part 110, 110' while the said embedding plate 112 is correspondent to the embedding seat 122 of the base 12 and serves as another locking component for combining base 12 and housing 11.

The base 12 mainly is used for embedding connecting terminals 13 and thus accepting memory card, in which two correspondent lateral walls 123 are used as specified tracks for guiding the insertion of memory card while a slantwise guide part 125 is installed at the opening of base 12, where four embedding holes 120 for embedding connecting terminals 13 are provided between two lateral walls 123 in order to connect memory card when memory card is inserted. Further, at two horizontal ends outside the lateral wall 123, locking parts 124, 124' are formed to lock the locking holes 111, 111' of the housing 11, while an embedding seat 122 is formed inside the lateral wall 123 to correspond to the embedding plate 112 between two bend parts 110, 110' on the housing 11. Finally, a bump 121 is formed at the rear edge of base 12 to serve as a resistance when memory card 2 is inserted.

Figure 3:
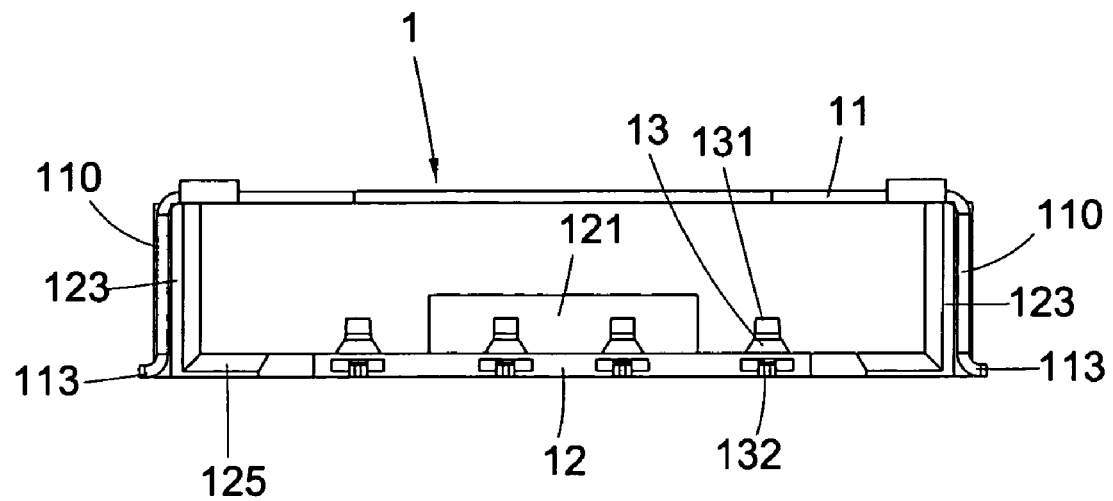
FIG. 3 shows a front view according to the present invention.
Figure 4:
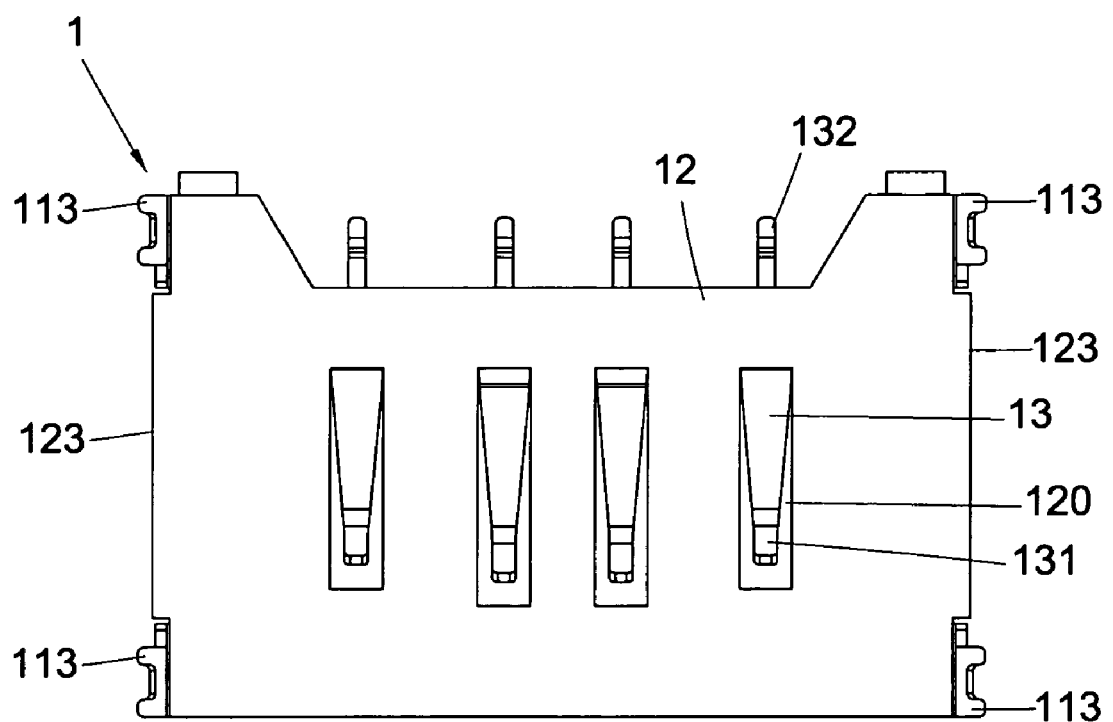
FIG. 4 shows an upward view according to the present invention.

When base 12 is combined with the housing 11, the embedding plate 112 should be correspondent to the embedding seats 122 at the two sides of base 12, and the housing 11 should be pushed down such that the locking holes 111, 111' of two bend parts 110, 110' accordingly lock on the locking parts 124, 124' of base 12. As the locking parts 124, 124' are provided with a design of one-way slide, after the housing 11 is combined with the base 12, the combination is locked, and the weld parts 113 at four corners of housing 11 can be used for welding to fix the embodied circuit board, as shown in FIGS. 3 and 4.

Moreover, at the end part of connecting terminals a bended contact part 131 is formed, which provides a upwards elastic force. When memory card 2 is inserted, connecting terminals 13 utilize the force reacting to the pressure to contact the connecting points of memory card 2, and complete the connection for reading. However, the fixity of the whole socket of card reader 1 is achieved through welding the weld part 132 at the front end of connecting terminals 13 to the implanted circuit board.

The invention claimed is:

1. A socket of card reader (I) for memory card with connecting terminals following specification of USB, which is a socket of card reader that reads USB-compatible memory card through USB, the said socket of card reader is composed of a housing, a base, and 4 connecting terminals, in which:

the said housing is made from metal material, and is integrally pressed into a form of hollow cube with bottom opened, wherein two locking holes are formed on the symmetrical bend parts and an embedding plate is install between two bend parts, while L-type weld part is formed at the end of each bend part such that the said locking hole and embedding plate serve as locking and embedding component when the housing is combined to the base;

the said base is embedded with connecting terminals to support connection when memory card is inserted, wherein locking parts are formed outside two correspondent lateral walls and embedding seats is installed inside the lateral walls to corresponds to the embedding plates on the housing, and four embedding holes for embedding connecting terminals are provided between two correspondent lateral walls, while a bump is formed at the rear edge to serve as a resistance when memory card is inserted; and a bended contact part is formed at the end part of connecting terminals to provide an upwards elastic force and a weld part is formed at the front side such that implanted circuit board can be welded and fixed.

2. A socket of card reader (I) for memory card with connecting terminals following specification of USB in accordance with claim 1, wherein the socket of card reader can achieve the connection to connector of the card reader in order to meet the need of extending and integrating the connection to multiple memory cards with distinct specifications.

3. A a socket of card reader (I) for memory card with connecting terminals following specification of USB in accordance with claim 2, wherein, to meet the variance between different specifications, the housing of the socket of card reader primarily is pressed into different shapes.

* * * * *